United States Patent [19]

Scaramucci

[11] Patent Number: 5,546,973
[45] Date of Patent: Aug. 20, 1996

[54] THREADED VALVE WITH SAFETY JOINT

[75] Inventor: John P. Scaramucci, Oklahoma City, Okla.

[73] Assignee: Balon Corporation, Oklahoma City, Okla.

[21] Appl. No.: 254,024

[22] Filed: Jun. 3, 1994

[51] Int. Cl.$^6$ .............................. F16L 55/18; F16K 51/00
[52] U.S. Cl. .................... 137/15; 251/148; 285/92; 411/123
[58] Field of Search ................... 138/81, 82, 92; 411/121, 122, 123; 251/148, 151, 152; 285/81, 92; 137/15, 315

[56] References Cited

U.S. PATENT DOCUMENTS

| | | | |
|---|---|---|---|
| 304,271 | 8/1884 | Lunkenheimer | 137/177 |
| 408,320 | 8/1889 | Powell | 411/121 |
| 474,821 | 5/1892 | Edmiston | 411/122 |
| 757,444 | 4/1904 | Entrekin | 301/132 |
| 858,191 | 6/1907 | Logan | 16/DIG. 37 |
| 1,002,774 | 9/1911 | Stouffer | 285/86 |
| 1,119,904 | 12/1914 | Vissering | 285/81 |
| 1,251,758 | 1/1918 | Dayton | 251/284 |
| 1,393,057 | 10/1921 | Vollmer | 285/92 |
| 1,398,681 | 11/1921 | Cooke | 16/DIG. 37 |
| 1,668,223 | 5/1928 | Utman | 137/382 |
| 1,692,188 | 11/1928 | Roose et al. | 137/382 |
| 2,189,654 | 2/1940 | Rief | 411/121 |
| 2,390,838 | 12/1945 | Johnson | 411/119 |
| 2,431,480 | 11/1947 | Hornsby | 411/123 |
| 2,807,388 | 9/1957 | Teeters | 251/367 |
| 3,206,165 | 9/1965 | Salmon et al. | 251/367 |
| 3,254,399 | 6/1966 | Zahuranec | 29/407 |
| 3,722,855 | 3/1973 | Massey | 251/151 |
| 4,050,494 | 9/1977 | de Claire | 151/49 |
| 4,118,007 | 10/1978 | Scapes | 251/223 |
| 4,452,248 | 6/1984 | Scaramucci | 251/367 |

FOREIGN PATENT DOCUMENTS

| | | | |
|---|---|---|---|
| 408246 | 3/1910 | France | 411/122 |
| 221823 | 5/1910 | Germany . | |
| 460595 | 5/1928 | Germany . | |
| 950553 | 2/1964 | United Kingdom . | |
| 1081784 | 8/1967 | United Kingdom . | |

*Primary Examiner*—A. Michael Chambers
*Attorney, Agent, or Firm*—Dunlap & Codding, P.C.

[57] ABSTRACT

A safety joint for a threaded fitting, such as a valve. A deformable lip is formed on one end of the fitting around an adapter threaded into the respective end of the fitting. The lip is deformed against the wrench flats on the adapter to lock the adapter to the fitting.

10 Claims, 2 Drawing Sheets

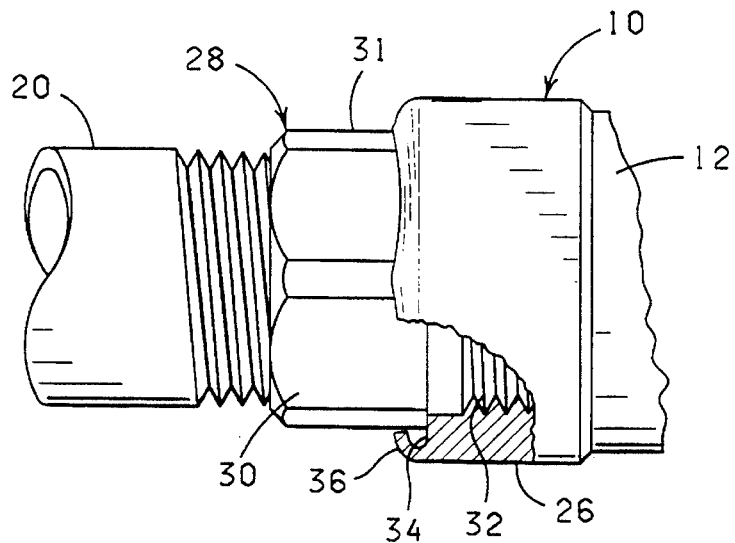
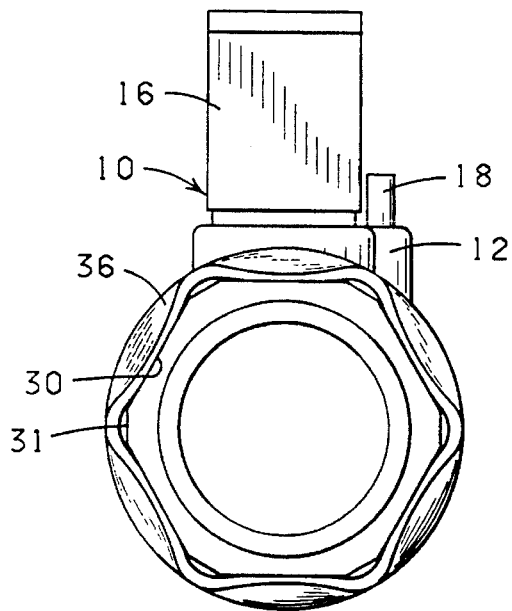

THREADED VALVE WITH SAFETY JOINT

BRIEF SUMMARY OF THE INVENTION

1. Field of the Invention

This invention relates generally to improvements in safety joints for threaded fittings, and more particularly, but not by way of limitation, to a safety joint for a threaded valve.

2. Background of the Invention

Valves and pipe fittings are often made with a threaded body joint. This threaded body joint allows the installation of all internal parts, such as the valve member and seats in a valve. Sometimes, when threading the valve or other fitting on the pipe, or when unthreading the pipe from one end of the valve or the fitting, the body joint will accidentally unscrew. This causes the valve to be disassembled. If the valve is under pressure or later pressurized, it can blow up.

Many users are requiring this type of valve to have the threaded body joint more positively retained. A common technique to help prevent the problem is to tack weld the joint, drill and pin after assembly, or to use a threaded adhesive. Each of these solutions have inherent problems, such as the loss of repairability.

SUMMARY OF THE INVENTION

The present invention secures the body joint of a fitting or valve by providing a deformable lip as a part of the body joint which is deformed against the wrench flats of the adapter forming a part of the body joint, such that the adapter will be secured in position against normal forces, but can be forcibly unthreaded if necessary for repair of the valve or fitting.

BRIEF DESCRIPTION OF THE DRAWINGS

FIG. 3 is a view similar to FIG. 1 showing the body joint portion, with the lip deformed against the adapter.

FIG. 4 is an end view of the structure as formed in FIG. 3 with the pipe removed.

DESCRIPTION OF THE PREFERRED EMBODIMENT

Figure 1:
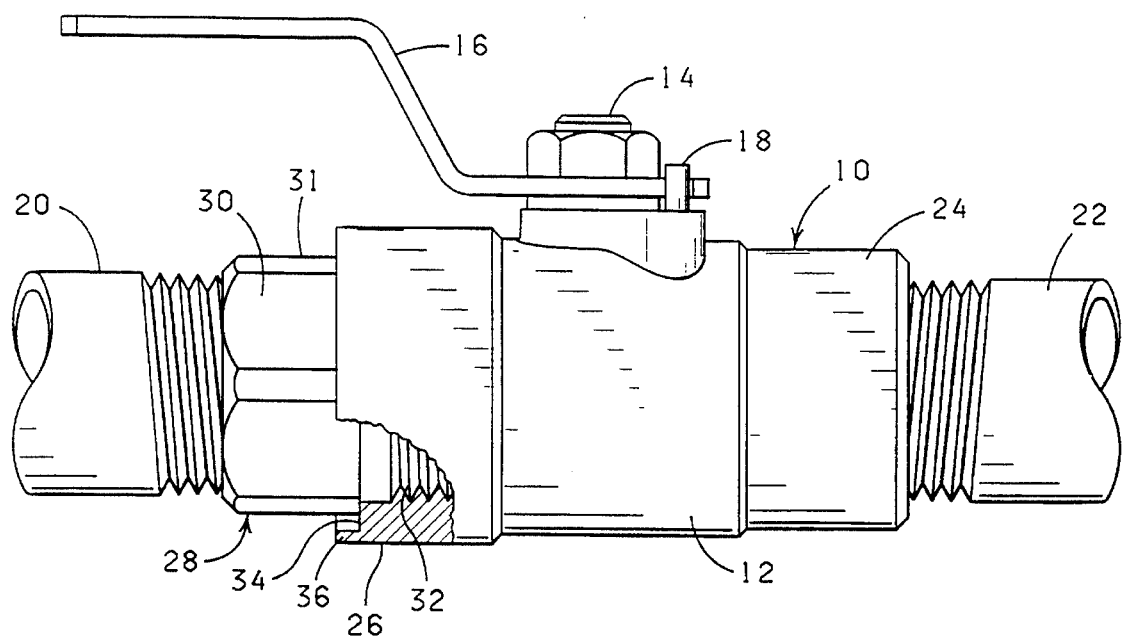
FIG. 1 is a side view of a valve constructed pursuant to this invention, with a portion of the body joint being shown in cross-section.

Referring to the drawings in detail, and particularly FIG. 1, reference character 10 generally designates a valve constructed pursuant to this invention. The valve 10 comprises a body 12 containing the usual valve member and seats (not shown), with a valve stem 14 extending through the side wall of the body 12. A handle 16 is suitably secured on the valve stem 14 and is employed for turning the valve stem 14, and hence the valve member to open and close the valve. The valve 10 also normally includes a stop pin 18 positioned to engage the handle 16 and control the amount of turning of the valve stem 14.

The valve 10 is of the type for being threadedly connected to adjacent pipe sections 20 and 22. Normally, the pipe section 22 is threaded directly into the respective end 24 of the valve body 12; whereas the pipe section 20 is connected to the respective end 26 of the valve body 12 by means of an adapter 28. The inner diameter of the end 26 of the valve body is larger than the inner diameter of the end 24, such that the internal components of the valve 10 can be installed through the end 26 and then held in position with the adapter 28. The combination of the adapter 28 and the end 26 of the valve body 12 is normally referred to as a "threaded body joint". It will also be observed that the adapter 28 is provided with a series of wrench flats 30 circumscribing the head portion 31 of the adapter, by means of which the adapter 28 can be threaded into and from the body 12.

Pursuant to the present invention, the internally threaded bore 32 at the end 26 of the body 12 is provided with a counterbore 34, forming a lip 36 surrounding the adjacent head portion 31 of the adapter 28. In other words, the adapter 28 is sized to be threaded into the end 26 of the body 12 until the head portion 31 abuts the end of the counterbore 34. As shown in FIGS. 3 and 4, the lip 36 is of such a size that it can be deformed radially inwardly to engage the wrench flats 30 of the adapter 28. With this arrangement, the adapter 28 will be secured in the valve body 12 against normal unthreading forces. However, if access to the inside of the valve 10 is required, what may be considered an excessive force can be applied to unthread the adapter 28 and at least partially deform the lip 36 back out toward the position shown in FIG. 1. When the lip 36 is deformed inwardly as shown in FIGS. 3 and 4, the valve 10 may be unthreaded from the pipe section 22, for example, for whatever reason, and the adapter 28 will be maintained in secure connection with the valve body. For example, if there is pressure on the pipe section 20 and the valve 10 is closed, the pipe section 22 can be unthreaded from the valve without disturbing the adapter 28 and without fear of leakage from the pipe section 20.

Figure 2:
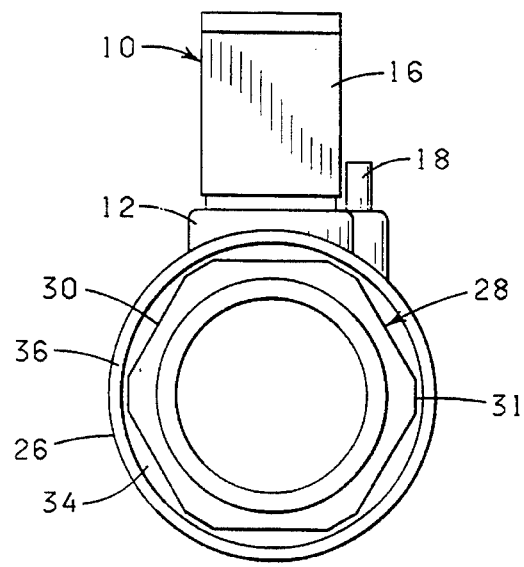
FIG. 2 is an end view of the body joint end of the valve of FIG. 1 with the pipe at that end of the valve removed.

In the event the adapter 28 is forcibly unthreaded from the body 12 by deformation of the lip 36 back out toward the position shown in FIGS. 1 and 2, the adapter can again be threaded back into the body section and the lip 36 again deformed against the outer periphery of the adapter into contact with the wrench flats 30.

Changes may be made in the combination and arrangement of the parts and elements or steps and procedures set forth herein without departing from the spirit and scope of the invention as defined in the following claims.

What is claimed is:

1. In a fitting having opposite ends and an adapter threaded into one end thereof, said adapter having wrench flats on the outer surface thereof, the steps of:

forming a deformable lip on said one end of the fitting around the adapter;

then deforming the lip against the wrench flats to lock the adapter to the fitting.

2. The method of claim 1 wherein the fitting is a valve.

3. The combination of:

a fitting having a body portion adapted to be threaded onto the ends of adjacent pipe sections;

an adapter threaded into one end of the fitting body having at least a pair of wrench flats on the outer surface thereof; and a deformable lip on the body portion of the fitting adjacent the adapter positioned to be deformed against the wrench flats to lock the adapter to the fitting.

4. The combination of claim 3 wherein the fitting is a valve.

5. The combination of claim 3 wherein the wrench flats on the adapter circumscribe the adapter.

6. The combination of claim 5 wherein the deformable lip, before deformation, surrounds the portion of the adapter adjacent the fitting body.

7. The combination of:

a fitting having opposite ends, a threaded bore in one end thereof and a counterbore therein adjacent the threaded bore forming a circumferential, deformable lip at said one end;

an adapter having an externally threaded portion threadedly engaging said threaded bore and a head portion abutting said one end inside of said lip;

whereby said lip may be deformed radially inwardly against the outer periphery of the adapter.

8. The combination of claim 7 wherein the adapter has wrench flats on the outer surface thereof positioned to be engaged by the lip.

9. The combination of claim 7 wherein the fitting is a valve.

10. The combination of claim 7 wherein the fitting has a threaded bore in each end thereof.

* * * * *